United States Patent
Wu et al.

(10) Patent No.: US 8,835,559 B2
(45) Date of Patent: Sep. 16, 2014

(54) RUBBER-MODIFIED POLYSTYRENE RESIN COMPOSITION FOR MAKING AN ELECTROPLATABLE ARTICLE

(75) Inventors: Chien-Chung Wu, Tainan (TW); Chun-Ting Kuo, Tainan (TW); Wen-Yi Su, Tainan (TW); Chen-Hsiang Fang, Tainan (TW)

(73) Assignee: Chi Mei Corporation, Tainan (TW)

( * ) Notice: Subject to any disclaimer, the term of this patent is extended or adjusted under 35 U.S.C. 154(b) by 57 days.

(21) Appl. No.: 13/299,086

(22) Filed: Nov. 17, 2011

(65) Prior Publication Data

US 2012/0142862 A1 Jun. 7, 2012

(30) Foreign Application Priority Data

Dec. 3, 2010 (TW) .............................. 99142282 A
Apr. 22, 2011 (TW) .............................. 100114204 A

(51) Int. Cl.
*C08L 51/04* (2006.01)
*C08F 279/02* (2006.01)
*C25D 5/54* (2006.01)
*C08L 55/02* (2006.01)

(52) U.S. Cl.
CPC .............. *C08F 279/02* (2013.01); *C08L 55/02* (2013.01); *C08L 51/04* (2013.01); *C25D 5/54* (2013.01)
USPC ........................................................ 525/71

(58) Field of Classification Search
USPC ........................................................ 525/71
See application file for complete search history.

(56) References Cited

U.S. PATENT DOCUMENTS

| | | |
|---|---|---|
| 3,903,200 A | 9/1975 | Cincera et al. |
| 4,277,574 A | 7/1981 | Jastrzebski et al. |
| 4,524,180 A | 6/1985 | Sun |
| 5,270,387 A * | 12/1993 | Sheilds et al. ............... 525/71 |
| 5,795,936 A | 8/1998 | Lin et al. |
| 5,883,190 A * | 3/1999 | Eichenauer .................. 525/71 |
| 2002/0032282 A1 * | 3/2002 | Hsu ............................. 525/191 |

FOREIGN PATENT DOCUMENTS

| | | |
|---|---|---|
| EP | 0 158 258 A2 | 10/1985 |
| EP | 0 474 618 A2 | 3/1992 |
| JP | 2-38435 | 2/1990 |
| JP | 10-251478 | 9/1998 |
| JP | 10-251478 A | 9/1998 |
| JP | 10-298375 A | 11/1998 |
| TW | 322488 | 12/1997 |
| TW | 562839 B | 11/2003 |
| WO | WO 89/05836 | 6/1989 |

OTHER PUBLICATIONS

EP Search Report; relating to Application No. EP 11 19 0353; dated Mar. 1, 2012; 7 pages.
Database WPI, XP 002670649; 1998; 1 page.
Database WPI, XP 002670650; 1990; 2 pages.
Database WPI, XP 002670651; 1998; 2 pages.
Taiwanese Search Report for TW application No. 100114204 completed by the TIPO on Jul. 22, 2013 (with English translation) (2 pages).

* cited by examiner

*Primary Examiner* — Jeffrey Mullis
(74) *Attorney, Agent, or Firm* — Christie, Parker & Hale, LLP

(57) ABSTRACT

A rubber-modified polystyrene resin composition is for making an electroplatable article which has a sectioned layer defining a unit area. The rubber-modified polystyrene resin composition includes a resin matrix, occlusion rubber particles dispersed in the resin matrix, and non-occlusion rubber particles dispersed in the resin matrix. A total sectional area ratio of the occlusion rubber particles to the non-occlusion rubber particles in the unit area ranges from 1.1 to 14.

9 Claims, No Drawings

RUBBER-MODIFIED POLYSTYRENE RESIN COMPOSITION FOR MAKING AN ELECTROPLATABLE ARTICLE

CROSS-REFERENCE TO RELATED APPLICATION

This application claims priority of Taiwanese application No. 099142282, filed on Dec. 3, 2010, and Taiwanese application No. 100114204, filed on Apr. 22, 2011.

BACKGROUND OF THE INVENTION

1. Field of the Invention

This invention relates to a rubber-modified polystyrene resin composition, more particularly to a rubber-modified polystyrene resin composition for making an electroplatable article that has superior electroplating property while preferably maintaining satisfactory physical properties.

2. Description of the Related Art

Rubber-modified polystyrene resin compositions have been widely used for producing several products, such as interior and exterior parts for automobiles, parts for electric and electronic equipments, or the like because of good processability and mechanical strength thereof. Specifically, the mouldings made of acrylonitrile-butadiene-styrene (ABS) resin are usually electroplated to impose a metallic appearance to the mouldings, such as the parts for automobiles.

Before being electroplated, the mouldings made of ABS resin are acid-etched so as to provide the mouldings with micro-structures (such as micro-recesses) on the surface thereof. The adhesion of the formed metallic electroplating layer with the surface of the mouldings can be enhanced thereby.

However, there are the following problems when the mouldings made of conventional ABS resin are electroplated:

(1) There are pinholes formed on the surface of the electroplated mouldings so that the appearance of the electroplated mouldings is not satisfactory.

(2) The etching property of the mouldings made of the conventional ABS resin is inferior so that the adhesion of the electroplating layer to the surface of the mouldings is insufficient and thus the electroplating layer peels easily.

(3) The mechanical strength of the mouldings made of the conventional ABS resin is reduced after etching and electroplating so that the application of the mouldings is limited.

Taiwanese Patent No. TW322488 discloses a rubber-modified styrene resin composition which has superior impact strength, gloss uniformity, and thermal stability. However, the problems regarding the pinholes and the inferior adhesion of the electroplating layer still exist when an article made of the rubber-modified styrene resin composition is electroplated.

SUMMARY OF THE INVENTION

An object of the present invention is to provide a rubber-modified polystyrene resin composition for making an electroplatable article that has superior electroplating property.

Another object of the present invention is to provide a rubber-modified polystyrene resin composition for making an electroplatable article that has satisfactory physical properties.

Accordingly, the rubber-modified polystyrene resin composition of the present invention is for making an electroplatable article which has a sectioned layer defining a unit area. The rubber-modified polystyrene resin composition includes a resin matrix, occlusion rubber particles dispersed in the resin matrix, and non-occlusion rubber particles dispersed in the resin matrix. A total sectional area ratio of the occlusion rubber particles to the non-occlusion rubber particles in the unit area ranges from 1.1 to 14.

In a preferable embodiment, additionally, the occlusion rubber particles have an average graft thickness ranging from 100 Å to 280 Å.

In a more preferable embodiment, additionally, the occlusion rubber particles have an average particle size ranging from 0.35 μm to 0.8 μm.

In a further more preferable embodiment, additionally, a combination of the occlusion rubber particles and the non-occlusion rubber particles is included in a range from 20 to 40 wt % based on 100 wt % of the rubber-modified polystyrene resin composition.

DETAILED DESCRIPTION OF THE PREFERRED EMBODIMENTS

As described above, the rubber-modified polystyrene resin composition of the present invention is for making an electroplatable article which has a sectioned layer defining a unit area. The rubber-modified polystyrene resin composition includes a resin matrix, occlusion rubber particles dispersed in the resin matrix, and non-occlusion rubber particles dispersed in the resin matrix. A total sectional area ratio of the occlusion rubber particles to the non-occlusion rubber particles in the unit area ranges from 1.1 to 14. The occlusion rubber particles have an average graft thickness ranging from 100 Å to 280 Å. The occlusion rubber particles have an average particle size ranging from 0.35 μm to 0.8 μm. A combination of the occlusion rubber particles and the non-occlusion rubber particles is included in a range from 20 to 40 wt % based on 100 wt % of the rubber-modified polystyrene resin composition.

Additionally, a combination of the resin matrix, the occlusion rubber particles, and the non-occlusion rubber particles includes 10 to 35 wt % of vinyl cyanide monomeric unit, 10 to 30 wt % of conjugated diene monomeric unit, 45 to 75 wt % of styrene monomeric unit, and 0 to 20 wt % of copolymerizable vinyl monomeric unit based on 100 wt % of the rubber-modified polystyrene resin composition.

As used herein, the term "occlusion rubber particles" means that each of the occlusion rubber particles includes a rubber base particle, and vinyl cyanide-styrene copolymer occluded in the rubber base particle and having a size not smaller than 0.05 μm.

As used herein, the term "non-occlusion rubber particles" means that each of the non-occlusion rubber particles includes a rubber base particle, and vinyl cyanide-styrene copolymer optionally occluded in the rubber base particle and having a size less than 0.05 μm. That is, in the non-occlusion rubber particles, there is no vinyl cyanide-styrene copolymer occluded in the rubber base particle, or there is vinyl cyanide-styrene copolymer having a size less than 0.05 μm occluded in the rubber base particle.

The rubber-modified polystyrene resin composition of the present invention is obtained from a vinyl cyanide monomer, a conjugated diene monomer, a styrene monomer, and an optional copolymerizable vinyl monomer.

Examples of the vinyl cyanide monomer include, but are not limited to, acrylonitrile, α-methyl acrylonitrile, or the like. Preferably, the vinyl cyanide monomer is acrylonitrile. The vinyl cyanide monomeric unit is derived from the vinyl cyanide monomer. In the rubber-modified polystyrene resin composition of the present invention, the vinyl cyanide monomeric unit is included in an amount ranging generally from 10 to 35 wt %, preferably from 15 to 30 wt %, and more preferably from 18 to 27 wt % based on 100 wt % of the rubber-modified polystyrene resin composition. When the amount of the vinyl cyanide monomeric unit is less than 10 wt %, the impact strength of the article made of the rubber-modified polystyrene resin composition is insufficient. When the amount of the vinyl cyanide monomeric unit is more than wt %, the color hue of the article made of the rubber-modified polystyrene resin composition is inferior.

Examples of the conjugated diene monomer include, but are not limited to, 1,3-butadiene, isoprene, 1,3-pentadiene, 1,3-hexadiene, 2,4-hexadiene, 2,3-dimethyl-1,3-butadiene, 2-ethyl-1,3-butadiene, and $C_4$-$C_7$ branched conjugated diene compounds. Among the examples of the conjugated diene monomer, 1,3-butadiene, isoprene, and 1,3-pentadiene are preferable, and 1,3-butadiene is more preferable. The examples of the conjugated diene monomer can be used alone or in combinations thereof. The conjugated diene monomeric unit is derived from the conjugated diene monomer. In the rubber-modified polystyrene resin composition of the present invention, the conjugated diene monomeric unit is included in an amount ranging generally from 10 to 30 wt %, preferably from 12 to 25 wt %, and more preferably from 14 to 20 wt % based on 100 wt % of the rubber-modified polystyrene resin composition. When the amount of the conjugated diene monomeric unit is less than 10 wt %, the impact strength of the article made of the rubber-modified polystyrene resin composition is insufficient. When the amount of the conjugated diene monomeric unit is more than 30 wt %, the electroplating property of the article made of the rubber-modified polystyrene resin composition is inferior.

Examples of the styrene monomer include, but are not limited to, styrene, α-methylstyrene, p-methylstyrene, vinyl toluene, vinyl naphthalene, vinyl ethylbenzene, and vinyl xylene. Among the examples of the styrene monomer, styrene, α-methylstyrene, and p-methylstyrene are preferable, and styrene is more preferable. The examples of the styrene monomer can be used alone or in combinations thereof. The styrene monomeric unit is derived from the styrene monomer. In the rubber-modified polystyrene resin composition of the present invention, the styrene monomeric unit is included in an amount ranging generally from 45 to 75 wt %, preferably from 50 to 72 wt %, and more preferably from 55 to 68 wt % based on 100 wt % of the rubber-modified polystyrene resin composition. When the amount of the styrene monomeric unit is less than 45 wt %, the processing formability of the rubber-modified polystyrene resin composition is insufficient. When the amount of the styrene monomeric unit is more than 75 wt %, the impact strength of the article made of the rubber-modified polystyrene resin composition is inferior.

The copolymerizable vinyl monomer is a monomer having a vinyl group and copolymerizable with the vinyl cyanide monomer, the conjugated diene monomer, and the styrene monomer. Examples of the copolymerizable vinyl monomer include, but are not limited to, acrylate monomer, methacrylate monomer, and maleimide monomer.

Examples of the acrylate monomer include, but are not limited to, methyl acrylate, ethyl acrylate, isopropyl acrylate, butyl acrylate, and polyethylene glycol diacrylate. Among the examples of the acrylate monomer, butyl acrylate is preferable.

Examples of the methacrylate monomer include, but are not limited to, methyl methacrylate, ethyl methacrylate, propyl methacrylate, butyl methacrylate, benzyl methacrylate, hexyl methacrylate, cyclohexyl methacrylate, dodecyl methacrylate, 2-hydroxyethyl methacrylate, epoxypropyl methacrylate, dimethylaminoethyl methacrylate, ethylene dimethacrylate, and neopentyl dimethacrylate. Among the examples of the methacrylate monomer, methyl methacrylate and butyl methacrylate are preferable.

Examples of the maleimide monomer include, but are not limited to, maleimide, N-methyl maleimide, and N-phenyl maleimide.

In addition to the acrylate monomer, the methacrylate monomer, and the maleimide monomer described above, the examples of the copolymerizable vinyl monomer further include an acrylic acid monomer (e.g., acrylic acid, methacrylic acid, or the like), unsaturated carboxylic acid compounds (e.g., anhydrous maleic acid, anhydrous cis-methylbutenedioic acid, anhydrous trans-methylbutenedioic acid, fumaric acid, itaconic acid, or the like) and esters thereof (e.g., dimethyl fumarate, dibutyl itaconate, or the like), or the like.

The examples of the copolymerizable vinyl monomer can be used alone or in combinations thereof. The copolymerizable vinyl monomeric unit which can be used in the present invention is derived from the copolymerizable vinyl monomer. In the rubber-modified polystyrene resin composition of the present invention, the copolymerizable vinyl monomeric unit can be included optionally in an amount ranging generally from 0 to 20 wt % based on 100 wt % of the rubber-modified polystyrene resin composition. When the amount of the copolymerizable vinyl monomeric unit is more than 20 wt %, the electroplating property and the impact strength of the article made of the rubber-modified polystyrene resin composition will be inferior.

As described above, the rubber-modified polystyrene resin composition of the present invention include the resin matrix, the occlusion rubber particles dispersed in the resin matrix, and the non-occlusion rubber particles dispersed in the resin matrix.

The occlusion rubber particles may be obtained preferably via bulk or solution polymerization. Specifically, when the bulk or solution polymerization is performed, the conjugated diene polymer is dissolved in the styrene monomer, a mixture composed of the styrene monomer and a portion of the vinyl cyanide monomer, or a mixture composed of the styrene monomer, a portion of the vinyl cyanide monomer, and a suitable solvent. The remaining monomer is then added, followed by polymerization. During polymerizing, portions of the vinyl cyanide monomer and the styrene monomer are copolymerized to form ungrafted vinyl cyanide-styrene copolymer. Other portions of the vinyl cyanide monomer and the styrene monomer are grated onto the conjugated diene polymer to form rubber particles, which are dispersed in the ungrafted vinyl cyanide-styrene copolymer.

The non-occlusion rubber particles are obtained via emulsion polymerization. Specifically, the vinyl cyanide monomer and the styrene monomer are added into the conjugated diene polymer emulsion, followed by grafting polymerization. In the polymerization, most of the vinyl cyanide monomer and the styrene monomer are grafted onto the conjugated diene polymer to form the non-occlusion rubber particles. Little of the vinyl cyanide monomer and the styrene monomer are copolymerized to form an ungrafted vinyl cyanide-styrene copolymer. After the emulsion polymerization, coagulation, washing, and dehydration are conducted. The obtained product is extruded with additionally produced vinyl cyanide-styrene copolymer to obtain a product containing the non-occlusion rubber particles dispersed in the vinyl cyanide-styrene copolymer.

The rubber-modified polystyrene resin composition of the present invention is produced by blending a first resin material containing a resin matrix and the occlusion rubber particles dispersed therein with a second resin material containing a resin matrix and the non-occlusion rubber particles dispersed therein.

When a sectional layer of an article made of the rubber-modified polystyrene resin composition of the present invention is observed using a transmission electron microscope, a total sectional area ratio of the occlusion rubber particles to the non-occlusion rubber particles in a unit area of the sectional layer ranges from 1.1 to 14, preferably from 2.5 to 9. When the total sectional area ratio is smaller than 1.1, the appearance and the adherence of an electroplating layer formed on the article made of the rubber-modified polystyrene resin composition is inferior. When the total sectional area ratio is larger than 14, the impact strength and/or the electroplating adherence of the article made of the inferior.

The non-occlusion rubber particles included in the rubber-modified polystyrene resin composition of the present invention have an average particle size preferably ranging from 0.15 µm to 0.5 µm. The non-occlusion rubber particles can be obtained by adding surfactant, chain-transfer agent, initiator, vinyl cyanide monomer, and styrene monomer into conjugated diene polymer emulsion, followed by emulsion graft copolymerization. The conjugated diene polymer emulsion can be homopolymer or copolymer of the aforesaid conjugated diene monomer. Examples of the conjugated diene polymer emulsion include, but are not limited to, emulsion of polybutadiene, polyisoprene, polychloroprene, butadiene-styrene copolymer, butadiene-acrylonitrile copolymer, butadiene-methyl methacrylate copolymer, isoprene-butyl acrylate copolymer, and combinations thereof. Among the aforesaid examples, polybutadiene emulsion or butadiene-styrene copolymer emulsion are preferable. The conjugated diene polymer may be directly polymerized to have a weight average particle size ranging from 0.15 µm to 0.5 µm. Alternatively, the conjugated diene polymer virgin with a weight average particle size ranging from 0.05 µm to 0.12 µm may be prepared first, which is then agglomerated to have a weight average particle size ranging from 0.15 µm to 0.5 µm by a conventional rubber agglomerating method. Examples of the rubber agglomerating method include a chemical agglomerating method, a freezing agglomerating method, and a mechanical stirring agglomerating method. The chemical agglomerating method is achieved by adding an acidic material, such as acetic anhydride, hydrogen chloride, or sulfuric acid; a metal salt, such as sodium chloride, potassium chloride, calcium chloride, or magnesium chloride; or a carboxylic acid group-containing polymeric agglomerating agent, such as (meth)acrylic acid-(meth)acrylate copolymer (for example, methacrylic acid-butyl acrylate copolymer).

In the emulsion graft copolymerization process, the dry weight amount of the conjugated diene polymer emulsion preferably ranges from 50 to 85 wt %, and the total weight amount of the vinyl cyanide monomer and the styrene monomer preferably ranges from 15 to 50 wt %, based on 100 wt % of the combined weight of the conjugated diene polymer emulsion, the vinyl cyanide monomer, and the styrene monomer. The initiator added in the polymerization process is preferably in a range from 0.01 to 5.0 wt %, and more preferably in a range from 0.1 to 3.0 wt % based on 100 wt % of the combined weight of the vinyl cyanide monomer and the styrene monomer. A small amount of chain transfer agent may be added in order to control the molecular weight of the graft copolymer. The initiator may be a peroxide compound, a diazo compound, or the like. Suitable examples of the peroxide initiator include, but not limited to, water soluble initiators, such as alkali metal peroxide, persulfate, perborate, peracetate, percarbonate, hydrogen peroxide, or the like, or di-tert-butyl-peroxide, benzoyl peroxide, lauroyl peroxide, oleyl peroxide, cumene hydroperoxide, and tert-butyl hydroperoxide. Suitable examples of the diazo compound initiator include, but are not limited to, 2,2'-azodi(isobutyronitrile), 2,2'-azodi(2-methylbutyronitrile), and 1,1'-azodi(hexahydrobenzonitrile). Suitable examples of the chain transfer agent include, but are not limited to, mercaptan (for example, n-dodecyl mercaptan, tert-dodecylmercaptan, or the like), halide, terpene, or other compounds having chain transfer property (for example, α-methylstyrene dimmer). The examples of the initiator and the examples of the chain transfer agent may be used alone or in combinations thereof, respectively.

The emulsion graft copolymerization is conducted by stirring at a temperature ranging from 20° C. to 100° C. and at a pressure ranging from 0 to 100 psig under inert atmosphere. The reaction time for the copolymerization ranges from 2 to 10 hours, preferably from 4 to 9 hours.

After the emulsion graft copolymerization, the emulsion is further processed by coagulating with coagulating agent, washing to remove impurities, dehydrating to reduce water moisture contained therein, and drying to remove residual moisture so as to produce a powdery resin containing the non-occlusion rubber particles. Optionally, the powdery resin may be extruded with vinyl cyanide-styrene copolymer and other rubber-modified polystyrene resin. When observed using a transmission electron microscope, the non-occlusion rubber particles have an average particle size preferably ranging from 0.05 µm to 0.5 µm. A mixture of various non-occlusion rubber particles, which are produced using different recipes, can be employed in the present invention, if necessary.

The occlusion rubber particles contained in the resin composition of the present invention have an average particle size ranging generally from 0.35 µm to 0.8 µm, preferably from 0.4 µm to 0.7 µm. When the average particle size of the occlusion rubber particles is smaller than 0.35 µm, the impact strength of the electroplated article made of the rubber-modified polystyrene resin composition is insufficient. When the average particle size of the occlusion rubber particles is larger than 0.8 µm, the electroplating appearance and the electroplating adherence of the electroplated article made of the rubber-modified polystyrene resin composition is inferior.

The occlusion rubber particles have an average graft thickness ranging from 100 Å to 280 Å. When the average graft thickness is less than 100 Å, the electroplating adherence of the electroplated article made of the rubber-modified polystyrene resin composition is inferior. When the average graft thickness is greater than 280 Å, the processing property of the rubber-modified polystyrene resin composition is inferior due to excessively high melt viscosity.

As described above, the occlusion rubber particles may be produced via the bulk or solution polymerization. When the bulk or solution polymerization is performed, the conjugated diene polymer in an amount ranging from 4 to 27 wt % is dissolved in a solution formed of the styrene monomer in an amount ranging from 63 to 96 wt % and the vinyl cyanide in an amount ranging from 0 to 30 wt %. Stirring is conducted at a suitable condition for the copolymerization. When the conversion for the copolymerization reaches 40-90 wt %, devolatilization is conducted to remove the volatile components, such as remaining monomer and solvent so as to produce a resin material containing the occlusion rubber particles which average particle size ranges from 0.35 µm to 0.8 µm and which grafting thickness ranges from 100 Å to 280 Å. Examples of the conjugated diene polymer include, but are not limited to, polybutadiene, polyisoprene, polychloroprene, butadiene-styrene copolymer, butadiene-acrylonitrile copolymer, butadiene-methyl methacrylate copolymer, isoprene-butyl acrylate copolymer, and combinations thereof. Among the aforesaid examples, polybutadiene, butadiene-styrene copolymer, and a combination thereof are preferable.

The bulk or solution polymerization for the present invention may be accomplished using reactors which are generally used for continuous bulk or solution polymerization. Examples of such reactors include plug flow reactors, continuous stirring tank reactors (CSTR) and tubular reactors having a static mixer. The plug flow reactor and the continuous stirring tank reactors are preferred. There may be one or more reactors. Two or more types of the aforesaid reactors can be used in combination. In the bulk or solution polymerization, the initiator, such as diacyl peroxides, peroxyesters, peroxyketals, peroxy(di)carbonates, or diazo compounds can be used.

In order to produce the occlusion rubber particles having the features defined in the present invention, i.e., an average particle size ranging from 0.35 µm to 0.8 µm and an average graft thickness ranging from 100 Å to 280 Å, the rubber content in the polymerization medium, the initiator, the polymerization temperature, the stirring speed of the reactor, the residence time, or the like should be selected or controlled properly. Generally speaking, as the initiator, the peroxide compound is preferred over the diazo compound in terms of grafting efficiency. The occlusion rubber particles may have relatively fine texture when the polymerization temperature is relatively low and the residence time is relatively long. The average particle size of the occlusion rubber particles is relatively small when the stirring speed of the reactor is relatively fast. The average particle size of the occlusion rubber particles is relatively small when the rubber content is relatively high, which results in a relatively high viscosity. The occlusion rubber particles having the features recited in the present invention can be produced by suitably adjusting the aforesaid parameters.

A combination of the occlusion rubber particles and the non-occlusion rubber particles (also referred to as "acetone-insolubles" herein) is included in a range from 20 to 40 wt % based on 100 wt % of the rubber-modified polystyrene resin composition. When the amount of the acetone-insolubles is less than 20 wt %, the impact strength of the article made of the rubber-modified polystyrene resin composition is insufficient. When the amount of the acetone-insolubles is more than 40 wt %, the electroplating property of the article made of the rubber-modified polystyrene resin composition is inferior.

The ranges of the average graft thickness and the average particle size of the occlusion rubber particles, the range of the total sectional area ratio of the occlusion rubber particles to the non-occlusion rubber particles, and the range of the amount of the acetone-insolubles desirable for the present invention can be obtained by suitably adjusting the aforesaid parameters for producing the occlusion rubber particles and the use ratio of the occlusion rubber particles to the non-occlusion rubber particles.

Optionally, suitable additives can be added to the rubber-modified polystyrene resin composition of the present invention. The additives include, but are not limited to, antioxidants, lubricants, UV absorbers, UV stabilizers, anti-statics, colorants, or the like. The additives can be added during the polymerization stage or during the extrusion stage. The additives can be added in an amount of less than 6 wt % based on 100 wt % of the rubber-modified polystyrene resin composition. Other additives, such as flame retardants, impact modifiers (for example, silicone rubber, (meth)acrylate-butadiene-styrene copolymer, or the like), or the like can be added, if necessary. The aforesaid additives can be added in an amount of less than 20 wt % based on 100 wt % of the rubber-modified polystyrene resin composition.

EXAMPLES

The following examples are provided to illustrate the preferred embodiments of the invention, and should not be construed as limiting the scope of the invention.

Preparation Example 1

Preparation of Resin Pellets Containing Occlusion Rubber Particles 103.2 parts by weight of styrene, 15 parts by weight of rubbery styrene-butadiene copolymer (weight ratio of styrene:butadiene=25 wt %:75 wt %, weight average molecular weight ($M_w$)=130,000), 45.4 parts by weight of ethylbenzene, 31.4 parts by weight of acylonitrile, 3.9 parts by weight of n-butyl acrylate, 0.08 part by weight of dodecyl mercaptan, 0.063 part by weight of octadecyl 3-(3,5-di-tert-butyl-4-hydroxyphenyl)propionate, and 0.063 part by weight of N,N-ethylene-bis-stearamide were mixed to form a mixture. 100 parts by weight of styrene, 3.0 parts by weight of 1,4-di-(tert-butylperoxyacetyl)cyclohexane, and 1.8 parts by weight of dibenzoyl peroxide were mixed to form an initiator solution.

The mixture and the initiator solution were continuously supplied to a first reactor at respective flow rates of 61 kg/hr and 1.3 kg/hr for conducting polymerization reaction therein, followed by transferring the contents in the first reactor into second, third, and fourth reactors set up in series for conducting further polymerization reactions. All of the four reactors were plug flow reactors each having a volume of 100 L and equipped with a stirrer. The reaction temperature and the stirring rate for the first reactor were respectively 75-90° C. and 110 rpm. The reaction temperature and the stirring rate for the second reactor were respectively 95-105° C. and 80 rpm. The reaction temperature and the stirring rate for the third reactor were respectively 110-125° C. and 60 rpm. The reaction temperature and the stirring rate for the fourth reactor were respectively 135-150° C. and 5 rpm. After the polymerization reactions in the reactors, a product polymer is formed, and a solid content of the product polymer was measured to be 62.5%.

The product polymer was then subjected to a devolatilization process so as to remove and recycle residual monomers and solvent, followed by extruding the product polymer through an extruder and cooling and cutting the same to obtain resin pellets (I). Occlusion rubber particles were observed in the resin pellets (I) using a transmission electronic microscope.

Preparation Example 2

Preparation of Resin Pellets Containing Occlusion Rubber Particles

The preparation of the resin pellets of Preparation Example 2 was similar to that in Preparation Example 1, except that the amount of the rubbery styrene-butadiene copolymer was changed to 21.9 parts by weight, the amount of 1,4-di-(tert-butylperoxyacetyl)cyclohexane was changed to 3.2 parts by weight, no n-butyl acrylate was added, the stirring rate for the first reactor was changed to 120 rpm, and the stirring rate for the second reactor was changed to 100 rpm. The solid content of the product polymer was measured to be 61.2%. The product polymer was then subjected to the devolatilization process, followed by extruding the product polymer and cooling and cutting the same to obtain resin pellets (II). Occlusion rubber particles were observed in the resin pellets (II) using a transmission electronic microscope.

Preparation Example 3

Preparation of Resin Pellets Containing Occlusion Rubber Particles

The preparation of the resin pellets of Preparation Example 3 was similar to that in Preparation Example 1, except that the amount of the rubbery styrene-butadiene copolymer was changed to 24.3 parts by weight, the amount of 1,4-di-(tert-butylperoxyacetyl)cyclohexane was changed to 3.2 parts by weight, no n-butyl acrylate was added, the stirring rate for the first reactor was changed to 120 rpm, and the stirring rate for the second reactor was changed to 120 rpm. The solid content of the product polymer was measured to be 60.3%. The product polymer was then subjected to the devolatilization process, followed by extruding the product polymer and cooling and cutting the same to obtain rubber pellets (III). Occlusion rubber particles were observed in the resin pellets (III) using a transmission electronic microscope.

Preparation Example 4

Preparation of Resin Pellets Containing Occlusion Rubber Particles

The preparation of the resin pellets of Preparation Example 4 was similar to that in Preparation Example 1, except that the amount of the rubbery styrene-butadiene copolymer was changed to 17.9 parts by weight, 1.2 parts by weight of azobisisobutyronitrile (AIBN) was used instead of 1.8 parts by weight of dibenzoyl peroxide, the stirring rate for the first reactor was changed to 120 rpm, and the reaction temperature for the first reactor was changed to 75-85° C. The solid content of the product polymer was measured to be 62.4%. The product polymer was then subjected to the devolatilization process, followed by extruding the product polymer and cooling and cutting the same to obtain rubber pellets (IV). Occlusion rubber particles were observed in the resin pellets (IV) using a transmission electronic microscope.

Preparation Example 5

Preparation of Resin Pellets Containing Occlusion Rubber Particles

The preparation of the resin pellets of Preparation Example 5 was similar to that in Preparation Example 1, except that the amount of the rubbery styrene-butadiene copolymer was changed to 16.7 parts by weight, 5 parts by weight of methyl methacrylate was used instead of 3.9 parts by weight of n-butyl acrylate, the amount of 1,4-di-(tert-butylperoxyacetyl)cyclohexane was changed to 3.2 parts by weight, and the stirring rate for the first reactor was changed to 120 rpm. The solid content of the product polymer was measured to be 62.8%. The product polymer was then subjected to the devolatilization process, followed by extruding the product polymer and cooling and cutting the same to obtain rubber pellets (V). Occlusion rubber particles were observed in the resin pellets (V) using a transmission electronic microscope.

Preparation Example 6

Preparation of Resin Pellets Containing Occlusion Rubber Particles

The preparation of the resin pellets of Preparation Example 6 was similar to that in Preparation Example 1, except that the amount of the rubbery styrene-butadiene copolymer was changed to 16.7 parts by weight, 3.9 parts by weight of n-butyl acrylate and 0.4 part by weight of N-phenyl maleimide were used instead of 3.9 parts by weight of n-butyl acrylate, the amount of 1,4-di-(tert-butylperoxyacetyl)cyclohexane was changed to 3.2 parts by weight, and the stirring rate for the first reactor was changed to 120 rpm. The solid content of the product polymer was measured to be 62.4%. The product polymer was then subjected to the devolatilization process, followed by extruding the product polymer and cooling and cutting the same to obtain rubber pellets (VI). Occlusion rubber particles were observed in the resin pellets (VI) using a transmission electronic microscope.

Preparation Example 7

Preparation of Resin Pellets Containing Non-Occlusion Rubber Particles 95.0 parts by weight of 1,3-butadiene, 5.0 parts by weight of acrylonitrile, 15.0 parts by weight of potassium persulfate solution, 3.0 parts by weight of sodium pyrosulfate, 1.5 parts by weight of potassium oleate, 140.0 parts by weight of distilled water, and 0.2 part by weight of tert-dodecanethiol were mixed and allowed to conduct a polymerization reaction at 65° C. for 12 hours so as to obtain a conjugated diene polymer emulsion having a solid content of 40% and a weight average particle size of 0.10 μm. The conversion rate of the polymerization reaction was 94%.

85.0 parts by weight of ethyl acrylate, 15.0 parts by weight of acrylic acid, 0.3 part by weight of tert-dodecylmercaptan, 2.0 parts by weight of potassium oleate, 1.0 part by weight of sodium dioctyl sulfosuccinate, 0.4 part by weight of cumene hydroperoxide, 0.3 part by weight of sodium formaldehyde sulfoxylate, and 200 parts by weight of distilled water were mixed and allowed to conduct a polymerization reaction at 75° C. for 5 hours so as to obtain a polymer coagulant containing carboxylic acid group and having a pH value of 6.0. The conversion rate of the polymerization reaction was 95%.

100 parts by weight of the conjugated diene polymer emulsion (dry weight) was coagulated using 3 parts by weight of the polymer coagulant (dry weight). The coagulated conjugated dienic polymer emulsion obtained thereby had a pH value of 8.5 and a weight average particle size of 0.30 μm.

Subsequently, 100 parts by weight of the coagulated conjugated diene polymer emulsion, 25 parts by weight of styrene, 8.3 parts by weight of acrylonitrile, 1.2 parts by weight of potassium oleate, 0.2 part by weight of tert-dodecyl mercaptan, 0.5 part by weight of cumene hydroperoxide, 3.0 parts by weight of ferrous sulfate solution (0.2%), 3.0 parts by weight of sodium formaldehyde sulfoxylate solution (10%), 20 parts by weight of ethylene diamine tetraacetic acid (EDTA) solution (0.25%), and 200 parts by weight of distilled water were mixed. The styrene and the acrylonitrile were added continuously during a time period of 5 hours so as to conduct a graft polymerization reaction therein and to obtain a grafted conjugated diene polymer emulsion. The resin pellets (VII) were therefore obtained by using calcium chloride to condense and dehydrate the grafted conjugated diene polymer emulsion, and then drying the same to have a moisture content lower than 2 wt %. Non-occlusion rubber particles were observed in the resin pellets (VII) by using a transmission electronic microscope.

Examples 1 to 6 and Comparative Examples 1 to 6

The resin pellets (I) to (VII) prepared from the Preparation Examples and an acrylonitrile-styrene copolymer commercially available from Chi Mei Corporation under a trade name of PN-127H (hereinafter referred to as resin pellets (VIII)) were dry-mixed in the amounts shown in Table 1, followed by extruding and pelletizing to obtain the rubber modified polystyrene resin composition.

Analysis of Physical Properties:

Each of the rubber modified polystyrene resin composition of Examples 1-6 and Comparative Examples 1-6 was subjected to the following analyses of physical properties, and the measurement results are shown in Table 1.

Content Analysis:

The contents of vinyl cyanide monomeric unit, conjugated diene monomeric unit, styrene monomeric unit, and copolymerizable vinyl monomeric unit contained in the rubber modified polystyrene resin compositions were analyzed using a Fourier Transform Infrared Spectrometer (Model No. Nexus 479) manufactured by Nicolet.

Acetone-Insolubles Analysis:

0.5 gram of the rubber modified polystyrene resin composition was added in 17.5 ml of acetone and was oscillated for 6 hours, followed by adding 17.5 ml of toluene and proceeding with oscillation overnight. The polystyrene resin composition solution was subjected to centrifugation so as to separate acetone-insolubles therefrom, followed by drying and weighing the acetone-insolubles, and calculating the weight percent of the acetone-insolubles.

Measurement of Average Graft Thickness:

The rubber modified polystyrene resin composition was dissolved in acetone, followed by subjecting the same to centrifugation so as to remove acetone-solubles from the polystyrene resin composition. The remainder of the polystyrene resin composition, i.e., the acetone-insolubles, was dispersed and uniformly mixed in epoxy adhesive, followed by adding and mixing a curing agent into the mixture of the acetone-insolubles and the epoxy adhesive. Test samples were obtained after curing.

The test samples were dyed by $OsO_4$. The conjugated diene monomeric unit portion of the occlusion rubber particles and the epoxy adhesive were dyed and turned to black color. The outer graft portion of the occlusion rubber particles was not dyed and was in white color. After dyeing, the test samples were cut into test sheets with a thickness of 90 nm, followed by observing and digitally capturing the image of the test sheets using a transmission electron microscope (TEM) with 60,000 times magnification. The TEM images of the test sheets, each of which contained more than 25 occlusion rubber particles, were analyzed by a software (version 3.0) of Soft Imaging System. The average graft thickness of the occlusion rubber particles was calculated according to the following formula:

$$\sum_{i=1}^{n} D_i^3 t_i \Big/ \sum_{i=1}^{n} D_i^3 \tag{I}$$

$$t = (A/L) \tag{II}$$

wherein

A is the area of the outer graft portion of an occlusion rubber particle,

L is circumference of the occlusion rubber particle excluding the outer graft portion, $D_i$ is diameter of an $i^{th}$ particle, which is an average diameter of the maximum diameters of the $i^{th}$ particle measured at the angular directions of 1°, 2°, 3° . . . 180°, and n is the number of the occlusion rubber particles contained in the test sheet, and is not less than 25.

Measurement of a Total Sectional Area Ratio of Occlusion Rubber Particles to Non-Occlusion Rubber Particles:

The aforementioned test sheets were observed and images thereof were digitally captured using a TEM with 10,000 times magnification. The TEM images of the test sheets were analyzed using the above software, in which the respective total sectional areas for the occlusion rubber particles and the non-occlusion rubber particles of the rubber modified polystyrene resin composition were measured, and the ratio of the total sectional area of the occlusion rubber particles to the non-occlusion rubber particles were calculated.

Measurement of an Average Particle Size of Occlusion Rubber Particles:

The aforementioned test sheets were observed and images thereof were digitally captured using a TEM with 10,000 times magnification.

The particle size of about 200-1000 of the occlusion rubber particles in the TEM images were respectively measured using the above software and the average particle size was calculated according to formula (II):

$$\text{Average particle size} = \sum_{j=1}^{m} n_j D_j^4 \Big/ \sum_{j=1}^{m} n_j D_j^3 \tag{II}$$

wherein $n_j$ is the number of the occlusion rubber particles having a particle size of $D_j$, and $D_j$ has the same definition as previously defined for Di.

Evaluation of Impact Strength (Izod):

Test samples were prepared by injection molding and measured by a standard of ASTM D-256.

Evaluation of Electroplating Adhesion:

Test samples were produced by injection molding and had a size of 150 mm×70 mm×3 mm. Before the electroplating process, the test samples were subjected to the following successive processes: (a) impregnating in an aqueous solution containing sodium hydroxide, sodium phosphate, sodium carbonate, and sodium dodecylbenzene sulfonate, at 67° C. for 20 minutes to conduct a degreasing treatment, and then washing with water for 4 minutes; (b) etching using an etchant composed of $Cr_2O_3$ (180 g/L) and $H_2SO_4$ (350 ml/L, specific gravity=1.84) at 67° C. for 30 minutes, and then washing with water for 4 minutes; (c) immersing in 3.0% hydrochloric acid at 35° C. for 1.5 minutes; and (d) immersing in a first solution composed of $SnCl_2$ (35 g/L) and HCl (100-200 ml/L) at 35° C. for 2 minutes, washing with water for 4 minutes, followed by immersing in a second solution composed of $PdCl_2$ (0.25-0.5 g/L), HCl (0.25-1 ml/L), and $H_3BO_3$ (20 g/L) at 35° C. for 3.5 minutes, and washing with water for 4 minutes.

Subsequently, the test samples were successively electroplated with a 50 μm copper electroplating layer at a current density of 3 A/dm², a 7 μm nickel electroplating layer at a current density of 3-5 A/dm², and a 2 μm chromium electroplating layer at a current density of 15 A/dm². After the electroplating processes, the test samples were immersed in a solution composed of $NaHSO_3$ (20 g/L) for 4 minutes, followed by washing with water for 8 minutes.

On the surface of each of the test samples, a 2 cm×2 cm square area was cut into 100 squares each with a size of 0.2 mm×0.2 mm, followed by adhering a tape with an adhesion of at least 45 g/mm, e.g., 3M #595, on the surface of the cut samples, and pressing the tape to affirm that the tape adheres to the surface of the cut samples tightly.

Subsequently, the tape was torn off along a direction normal to the surface of the cut sample quickly, followed by observing the cut samples using a magnifier to count the number of the squares that showed peeling of the electroplating layers.

Evaluation of Electroplating Adhesion:
"◯" represents a number not more than 10,
"Δ" represents a number more than 10 and not more than 20,
"X" represents a number more than 20 and not more than 30, and
"XX" represents a number more than 30.

Pinhole Test:

The rubber modified polystyrene resin compositions were extruded into thin films with a thickness of 0.005±0.0025 inch using an upward blow molding single-screw extruder. Each of the resin composition films was observed in an area of 10 cm×10 cm to detect the existence and the diameter (R) of foreign particles. The evaluation of the pinhole test was based on the following standard.

| R (mm) | Evaluation (score) |
| --- | --- |
| R ≤ 0.05 | 0 |
| 0.05 < R ≤ 0.15 | 1 |
| 0.15 < R ≤ 0.25 | 2 |
| 0.25 < R ≤ 0.3 | 4 |
| 0.30 < R ≤ 0.4 | 9 |
| 0.00 < R | 21 |

Evaluation of Pinhole:
"◯" represents a score less than 3,
"Δ" represents a score less than 9,
"X" represents a score less than 18, and
"XX" represents a score less than 30.

The results of physical properties of each of the rubber modified polystyrene resin composition of Examples 1-6 and Comparative Examples 1-6 are shown in Table 1.

TABLE 1

| | E1 | E2 | E3 | E4 | E5 | E6 | CE1 | CE2 | CE3 | CE4 | CE5 | CE6 |
| --- | --- | --- | --- | --- | --- | --- | --- | --- | --- | --- | --- | --- |
| Resin pellets (I) | 92 | 87 | — | — | — | — | — | — | 72 | 25 | 100 | — |
| Resin pellets (II) | — | — | 97 | 87 | — | — | — | — | — | — | — | — |
| Resin pellets (III) | — | — | — | — | — | — | — | 87 | — | — | — | 100 |
| Resin pellets (IV) | — | — | — | — | — | — | 92 | — | — | — | — | — |
| Resin pellets (V) | — | — | — | — | 92 | — | — | — | — | — | — | — |
| Resin pellets (VI) | — | — | — | — | — | 92 | — | — | — | — | — | — |
| Resin pellets (VII) | 8 | 13 | 3 | 13 | 8 | 8 | 8 | 13 | 20 | 18 | — | — |
| Resin pellets (VIII) | — | — | — | — | — | — | — | — | 8 | 57 | — | — |
| Vinyl cyanide monomeric unit (wt %) | 19.3 | 18.8 | 19.0 | 18.0 | 19.1 | 19.2 | 18.9 | 17.5 | 19.0 | 24.5 | 20.1 | 18.6 |
| conjugated diene monomeric unit (wt %) | 13.9 | 17.0 | 14.8 | 20.6 | 14.6 | 14.8 | 15.3 | 21.9 | 20.3 | 15.0 | 8.9 | 14.5 |
| styrene monomeric unit (wt %) | 65.0 | 62.5 | 66.2 | 61.3 | 63.9 | 64.0 | 63.7 | 60.6 | 58.9 | 31.3 | 69.0 | 66.9 |
| copolymerizable vinyl monomeric unit (wt %) | 1.8 | 1.7 | — | — | 2.4 | 2.0 | 2.0 | — | 1.4 | 0.5 | 2.0 | — |
| Occlusion rubber particles | Yes | Yes | Yes | Yes | Yes | Yes | Yes | Yes | Yes | Yes | Yes | Yes |
| Non-occlusion rubber particles | Yes | Yes | Yes | Yes | Yes | Yes | Yes | Yes | Yes | Yes | No | No |
| Average graft thickness of occlusion rubber particles (Å) | 132 | 132 | 182 | 182 | 139 | 180 | 82 | 201 | 132 | 132 | 132 | 201 |
| Average particle size of occlusion rubber particles (μm) | 0.51 | 0.51 | 0.70 | 0.70 | 0.47 | 0.70 | 0.55 | 0.97 | 0.51 | 0.51 | 0.51 | 0.97 |
| total sectional area ratio | 2.5 | 1.4 | 9.9 | 2.1 | 2.8 | 9.8 | 2.9 | 2.1 | 0.77 | 0.30 | >14 | >14 |
| Acetone-insolubles (wt %) | 22.2 | 25.4 | 26.3 | 31.8 | 24.2 | 25.9 | 24.9 | 32.2 | 28.4 | 18.7 | 17.2 | 25.1 |
| Impact strength (kg-cm/cm) | 22 | 30 | 23 | 32 | 26 | 25 | 23 | 32 | 30 | 18 | 12 | 25 |
| Pinhole | ◯ | ◯ | ◯ | ◯ | ◯ | ◯ | ◯ | ◯ | X | X | ◯ | ◯ |
| Electroplating adhesion | ◯ | ◯ | ◯ | ◯ | ◯ | ◯ | X | X | X | X | ◯ | X |

As shown in Table 1, in Comparative Example 1, the average graft thickness of the occlusion rubber particles is less than 100 Å, and the electroplating adhesion is inferior. In Comparative Example 2, the average particle size of the occlusion rubber particles is more than 0.8 μm, and the electroplating adhesion is inferior. In Comparative Examples 3 and 4, the total sectional area ratio of the occlusion rubber particles to the non-occlusion rubber particles is less than 1.1, and the electroplating adhesion is inferior and the pinhole evaluation is unsatisfactory. In Comparative Example 5, the content of the conjugated diene monomeric unit is less than 10 wt % and the non-occlusion rubber particles are not included, and thus the impact strength is insufficient. In Comparative Example 6, the average particle size of the occlusion rubber particles is more than 0.8 μm, and the electroplating adhesion is inferior.

In view of the aforesaid, an electroplatable article that has superior electroplating property while maintaining satisfactory physical properties can be obtained using the rubber-modified polystyrene resin composition having the specific features of the present invention.

While the present invention has been described in connection with what are considered the most practical and preferred embodiments, it is understood that this invention is not limited to the disclosed embodiments but is intended to cover various arrangements included within the spirit and scope of the broadest interpretations and equivalent arrangements.

What is claimed is:

1. A rubber-modified polystyrene resin composition for making an electroplatable article which has a sectioned layer defining a unit area, said rubber-modified polystyrene resin composition comprising:
   a resin matrix;
   occlusion rubber particles dispersed in said resin matrix, said occlusion rubber particles including a rubber base particle in which vinyl cyanide-styrene copolymer having a size not smaller than 0.05 μm is occluded and said occlusion rubber particles having an average graft thickness ranging from 100 Å to 280 Å and an average particle size ranging from 0.35 μm to 0.8 μm; and
   non-occlusion rubber particles dispersed in said resin matrix, said non-occlusion rubber particles including a rubber base particle being free of vinyl cyanide-styrene copolymer or in which vinyl cyanide-styrene copolymer having a size less than 0.05 μm is occluded;
   wherein a total sectional area ratio of said occlusion rubber particles to said non-occlusion rubber particles in the unit area ranges from 1.1 to 14.

2. The rubber-modified polystyrene resin composition as claimed in claim 1, wherein a combination of said occlusion rubber particles and said non-occlusion rubber particles is included in a range from 20 to 40 wt % based on 100 wt % of said rubber-modified polystyrene resin composition.

3. The rubber-modified polystyrene resin composition as claimed in claim 2, wherein a combination of said resin matrix, said occlusion rubber particles and said non-occlusion rubber particles includes 10 to 35 wt % of vinyl cyanide monomeric unit, 10 to 30 wt % of conjugated diene monomeric unit, 45 to 75 wt % of styrene monomeric unit, and 0 to 20 wt % of copolymerizable vinyl monomeric unit based on 100 wt % of said rubber-modified polystyrene resin composition.

4. The rubber-modified polystyrene resin composition as claimed in claim 1, wherein said total sectional area ratio of said occlusion rubber particles to said non-occlusion rubber particles in the unit area ranges from 2.5 to 9.

5. The rubber-modified polystyrene resin composition as claimed in claim 1, wherein said average particle size of said occlusion rubber particles ranges from 0.4 μm to 0.7 μm.

6. The rubber-modified polystyrene resin composition as claimed in claim 1, wherein said occlusion rubber particles are obtained via bulk polymerization or solution polymerization.

7. The rubber-modified polystyrene resin composition as claimed in claim 3, wherein said copolymerizable vinyl monomeric unit is selected from the group consisting of acrylate monomeric unit, methacrylate monomeric unit, and maleimide monomeric unit.

8. The rubber-modified polystyrene resin composition as claimed in claim 7, wherein said acrylate monomeric unit is butyl acrylate monomeric unit, said methacrylate monomeric unit is methyl methacrylate monomeric unit, and said maleimide monomeric unit is N-phenyl maleimide monomeric unit.

9. The rubber-modified polystyrene resin composition as claimed in claim 1, wherein said non-occlusion rubber particles have an average particle size ranging from 0.15 μm to 0.5 μm.

* * * * *